United States Patent [19]

Kaizu et al.

[11] Patent Number: 4,998,436

[45] Date of Patent: Mar. 12, 1991

[54] BELT SUPPORTING STRUCTURE FOR BENCH TESTING APPARATUS

[75] Inventors: Hideo Kaizu; Kimihiko Kaneko, both of Tokyo, Japan

[73] Assignee: Kabushiki Kaisha Meidensha, Tokyo, Japan

[21] Appl. No.: 490,317

[22] Filed: Mar. 8, 1990

[30] Foreign Application Priority Data

| | | |
|---|---|---|
| Mar. 9, 1989 [JP] | Japan | 1-57572 |
| Mar. 10, 1989 [JP] | Japan | 1-59278 |
| Mar. 24, 1989 [JP] | Japan | 1-73218 |
| Mar. 24, 1989 [JP] | Japan | 1-73219 |
| Apr. 4, 1989 [JP] | Japan | 1-39669[U] |
| Apr. 4, 1989 [JP] | Japan | 1-39670[U] |
| Apr. 5, 1989 [JP] | Japan | 1-40256[U] |
| Apr. 5, 1989 [JP] | Japan | 1-40257[U] |

[51] Int. Cl.⁵ ............................................. G01M 19/00
[52] U.S. Cl. ............................................................ 73/117
[58] Field of Search ........................... 73/117, 123, 126

[56] References Cited

U.S. PATENT DOCUMENTS 3,520,180  7/1970  Polhemus et al. ............ 73/117 U X

*Primary Examiner*—Jerry W. Myracle
*Attorney, Agent, or Firm*—Bachman & LaPointe

[57] ABSTRACT

An endless belt type bench testing apparatus includes a pair of rotary drums, a flexible endless belt wound over the rotary drums and extending therebetween, and a supporting base disposed between the rotary drums and including an operating surface which faces a portion of the belt with a predetermined clearance gap therebetween. The operating surface is formed with a plurality of discharge ports which communicate with a liquid medium supply source for establishing a hydraulic pressure in a form of a liquid medium layer at the clearance gap. An improved structure is included for ensuring effective generation of a dynamic pressure in a form of the liquid medium layer at the clearance gap.

12 Claims, 7 Drawing Sheets

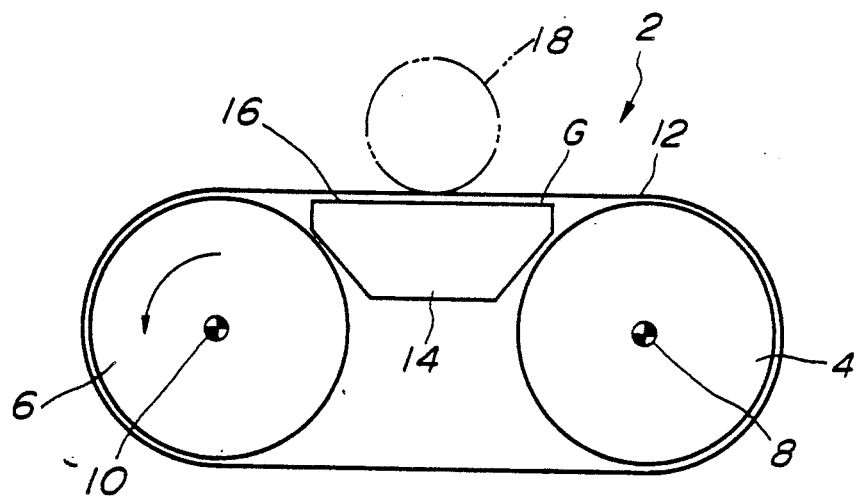
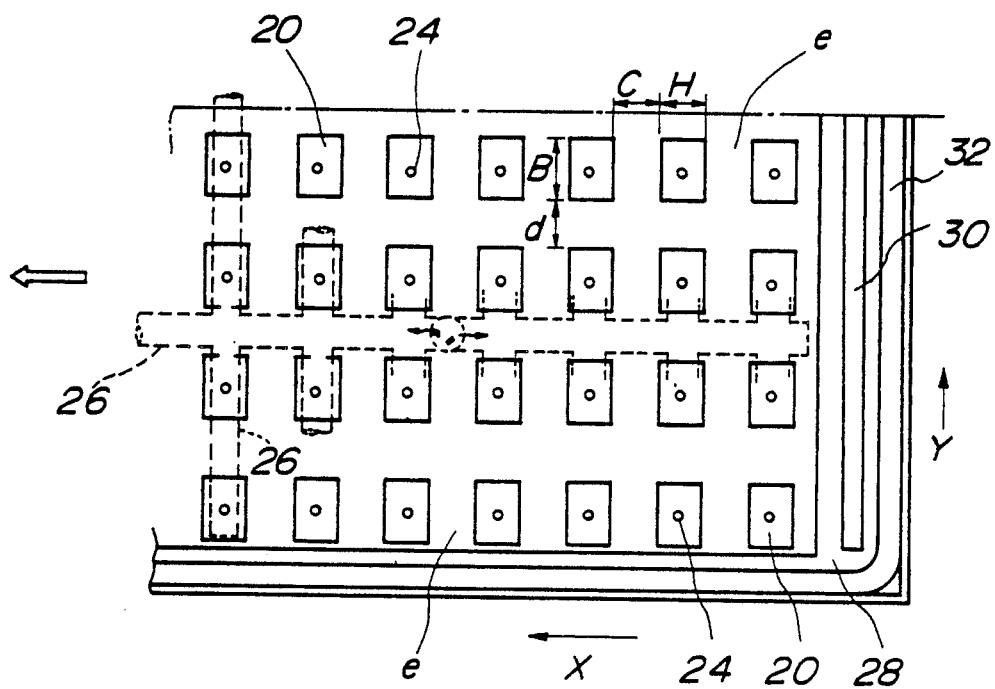

BELT SUPPORTING STRUCTURE FOR BENCH TESTING APPARATUS

BACKGROUND OF THE INVENTION

1. Field of the Invention

The present invention relates generally to an endless belt type bench testing apparatus, and more specifically, to an endless belt supporting structure for a bench testing apparatus for use in, such as, testing vehicular tires and vehicular performance, with an improved structure which ensures a dynamic pressure to be effectively generated between an endless belt and its supporting base.

2. Description of the Background Art

In an endless belt type bench testing apparatus, a flexible endless belt extending between a pair of rotary drums is used as a simulated road on which a vehicle tire or tires are placed, to perform a simulated road test which is equivalent to a test performed on an actual road. For example, in case of a vehicular tire test, a tire is placed on the endless belt to measure deformation of the tire or tire tread at various tire loads with various slip angles or camber angles or the like applied to the tire, as well as to measure a torque exerted on the drum, or the like. On the other hand, in case of a vehicular bench test on a chassis dynamometer, a fuel economy test, an engine performance test, an endurance test or the like is performed by placing all of the tires of the vehicle on the endless belt.

The endless belt type bench testing apparatus utilizes a hydraulic supporting structure for supporting the endless belt agist the tire load as well as for ensuring a smooth movement of the belt which is driven by the tire or tires. Two types of the hydraulic belt supporting structure are known in the art, one using a dynamic pressure of a liquid lubricating medium and the other using a static pressure of the liquid lubricating medium.

Japanese Patent First (unexamined) Publication (Tokkai) Showa No. 56-129836 discloses the endless belt type bench testing apparatus which utilizes the dynamic pressure of the supporting liquid medium. In the disclosed structure, a supporting base is provided between the pair of the drums and beneath the endless belt in a manner to define a small clearance gap between the endless belt and the supporting base. The liquid medium, such as, water is supplied into the clearance gap for generating the dynamic pressure in the form of a thin liquid layer between the endless belt and the supporting base so as to support the belt against the tire load.

Specifically, an upper surface of the supporting base facing the belt is formed with a plurality of water supply ports in the form of elongate grooves each extending in a direction perpendicular to a running direction of the endless belt substantially over a width of the endless belt. The water supply ports are arranged at a predetermined interval along the belt running direction and define land portions between the adjacent ports. Each port is provided at its bottom with a water supply hole communicating with a water supply source through a water supply path formed in the supporting base. When the vehicular tire mounted on the endless belt is driven with the pressurized water supplied into the water supply ports, the dynamic pressure in the form of a thin liquid layer is hydraulically generated in the clearance gap between the endless belt and the land portions of the supporting base upper surface, so as to support the endless belt against the tire load.

On the other hand, Japanese Patent First (unexamined) Publication (Tokkai) Showa No. 55-128140 discloses the endless belt type bench testing apparatus which utilizes the static pressure of the liquid lubricating medium. In the disclosed structure, a number of water supply ports each having a circular shape in plan view are provided on the upper surface of the supporting base in place of the elongate grooves as mentioned above. The static pressure is generated in the clearance gap between the endless belt and the supporting base upper surface by supplying the highly pressurized water into the circular ports. The static pressure raises and supports the endless belt against the tire load.

In the bench testing apparatus utilizing the dynamic pressure, there is advantage that a small amount of the water is enough to effectively support the belt against the tire load, while there is disadvantage that, since the dynamic pressure necessary for supporting the belt is established by a stress which is generated by a shearing action of the water after the belt reaches a certain high speed, there is no dynamic pressure or only an insufficient dynamic pressure generated between the belt and the supporting base upper surface until the belt reaches the certain high speed. Accordingly, the belt contacts the supporting base upper surface under pressure due to the applied tire load, resulting in damages or breakages of the belt and the supporting base.

Further, since each elongate port is continuous in the direction perpendicular to the belt running direction, if the running belt is slanted due to bias or offset of the tire load applied to the belt, the running belt rises at a side where the applied tire load is smaller than that at the other side of the belt, resulting in leakage of the water to cause a dynamic pressure drop so that the effective supporting of the belt is not attained.

Further, in the above-noted Japanese Patent First (unexamined) Publication (Tokkai) Showa No. 56-129836, since each elongate port has a planar bottom, the water supplied into each elongate port is not effectively introduced by the running belt into the clearance gap between the running belt and the land portions of the supporting base upper surface due to an upright wall of each elongate port existing at its side downstream of the running belt, resulting in insufficient dynamic pressure generated between the running belt and the land portions.

Still further, since there is inevitably provided a land portion at an upstream end portion of the supporting base upper surface, i.e. the land portion being not defined by the adjacent elongate ports, no dynamic pressure is generated between the running belt and this land portion, resulting in possibility of damages of the belt and the supporting base.

On the other hand, in the above-noted Japanese Patent First (unexamined) Publication (Tokkai) Showa No. 55-128140 which utilizes the static pressure of the water, the above mentioned problems are not pertinent. However, since the running belt is supported by the static pressure of the water generated within the clearance gap between the belt and the supporting base upper surface, it is necessary to supply a large amount of the highly pressurized water into the circular ports, leading to the necessity of providing a large water supply equipment. Further, since a large amount of the water is circulated through a water supply circuit, a large equipment is also required for controlling a temperature of the water. Still further, since the highly pressurized water is used, the water is likely to dispersed out of the clearance gap between the running belt and the supporting base upper surface. Accordingly, a highly reliable sealing structure is also required.

Further, in the bench testing apparatus utilizing the dynamic pressure of the water, there has been proposed a supporting base which is constituted by first and second sections. The first section is disposed facing the belt with the predetermined clearance gap therebetween and is made of material, such as Teflon, for ensuring a smooth contact with the running belt so as to prevent the damages of the belt when the belt contacts with the first section under pressure due to the tire load, particularly during the speed of the running belt below the certain high speed as mentioned above. The second section is fixed to an underside of the first section by a plurality of bolts. Each bolt is inserted into a first mounting hole formed vertically through the first section and further into a second mounting hole formed in the second section for firmly connecting the first and second sections. The first mounting hole has a stepped shape having an upper larger diameter section for receiving a head of the bolt and a lower smaller diameter section. The bolt is inserted such that the bolt head is within the larger diameter section with some virtical distance between a surface level of the land portion and an upper end of the bolt head.

In this mounting structure, however, since the land portions include the recessed portions (the larger diamter sections of the first mounting holes), the water flows generated by the running belt are disturbed due to the existence of the recessed portions, resulting in generation of the insufficient dynamic pressure of the water.

SUMMARY OF THE INVENTION

Therefore, it is an object of the present invention to provide an endless belt type bench testing apparatus that can eliminate the above-noted defects inherent in the background art.

It is another object of the present invention to provide an endless belt type bench testing apparatus, wherein the hydraulic pressure sufficient for effectively supporting an endless belt is ensured during all the operating speeds of the .belt including at the starting of the running of the belt and before the running belt reaches a certain high speed, by utilizing both the dynamic pressure and the static pressure of a liquid medium.

It is still another object of the present invention to provide an endless belt type bench testing apparatus, wherein an insufficient supporting of a running belt due to a dynamic pressure drop of a liquid medium due to a leakage thereof is effectively prevented even when bias or offset of a tire load on a running belt occurs.

It is further object of the present invention to provide an endless belt type bench testing apparatus, wherein a dynamic pressure of a liquid medium is effectively generated by a running movement of an endless belt.

It is still further object of the present invention to provide an endless type bench testing apparatus, wherein a dynamic pressure of a liquid medium is effectively generated even at an upstream end portion of a supporting base provided beneath an endless belt.

It is still further object of the present invention to provide an endless type bench testing apparatus, wherein a relatively small amount of a liquid medium supply is sufficient for effectively supporting an endless belt by utilizing the dynamic pressure and the static pressure of the liquid medium.

It is still further object of the present invention to provide an endless type bench testing apparatus, wherein a dynamic pressure of a liquid medium is effectively generated even when a supporting base is constituted by first and second sections firmly connected to each other by means of bolts.

To accomplish the above mentioned and other objects, according to one aspect of the present invention, an endless belt type bench testing apparatus comprises a pair of rotary drums arranged with a predetermined distance therebetween, a flexible endless belt wound over the rotary drums and extending therebetween, the belt adapted to move in a first direction, and a supporting base disposed between the rotary drums and having an operating surface which faces a portion of the belt with a predetermined clearance gap therebetween.

The operating surface is formed with a plurality of first discharge ports which communicate with a liquid medium supply source through first means formed in the supporting base for establishing a hydraulic pressure in a form of a liquid medium layer at the clearance gap.

Second means is provided in association with the liquid medium, for ensuring effective generation of a dynamic pressure in a form of the liquid medium layer at the clearance gap.

The second means may include an arc-shaped bottom of each of the discharge ports, the bottom extending in an arc in the first direction.

The discharge ports may be arranged in an alignment in the first direction and in an alignment in a second direction perpendicular to the first direction to form a matrix of the discharge ports on the operating surface.

The second means may include a slant surface of each of the discharge ports, the slant surface being formed at a downstream side of each discharge port with respect to the first direction and being inclined upward along the first direction for smoothly guiding the liquid medium into the clearance gap.

The second means may include an arrangement of the discharge ports on the operating surface such that the discharge ports are arranged in an alignment in a second direction perpendicular to the first direction, while the discharge ports are shifted in position alternately in the first direction in a manner that when viewing along the first direction, at least one of the discharge ports is provided on the operating surface except for at opposite ends of the operating surface in the second direction.

Each discharge port may have a rectangular or square shape in plan view having a first side extending along the first direction and a second side extending along a second direction perpendicular to the first direction, the discharge ports being arranged in an alignment in the first direction and in an alignment in the second direction to form a matrix of the discharge ports on the operating surface, and the second means may include an arrangement of the discharge ports on the operating surface such that a length of the first side is no less than a distance in the first direction between the adjacent discharge ports and a distance in the second direction between the adjacent discharge ports may be one-half to two-thirds of a length of the second side.

The first discharge ports may be arranged in an alignment in the first direction and in an alignment in a second direction perpendicular to the first direction to form a matrix of the first discharge ports on the operating surface, and the second means may include a plurality of second discharge ports each extending in the second direction essentially across the operating surface except for at opposite ends of the operating surface in the second direction, the first and second discharge ports arranged alternately in the first direction.

The second means may include an additional liquid medium supply system which supplies liquid medium at an upstream end of the operating surface with respect to the first direction to generate the dynamic pressure between the belt and the upstream end of the operating surface.

The second means may includes a slant surface formed at the upstream end of the operating surface, the slant surface being inclined upward along the first direction.

The supporting base may include first and second sections, the first section having the operating surface and the second section being arranged under the first section, and the first means may include a liquid medium supply path formed in the second section and communicating with the liquid medium supply source, the first means further including a first hole formed in the first section and extending from a bottom of each discharge port and a corresponding second hole formed in the second section and extending from the liquid medium supply path, the first and second holes being aligned with each other and cooperatively communicating the discharge port with the liquid medium supply path, and the second means may include a plurality of mounting bolts each inserted into the first and second holes in a manner to firmly fix the first and second sections, each bolt having a third hole formed therethrough for allowing the liquid medium from the liquid medium supply path to pass through the third hole into the discharge port.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 1 is a schematic side view showing a general structure of an endless belt type bench testing apparatus, to which all preferred embodiments according to the present invention are applicable;

FIG. 3 is a plan view showing a major portion of the endless belt type bench testing apparatus according to a second preferred embodiment of the present invention;

DESCRIPTION OF THE PREFERRED EMBODIMENT

Figure 2A:
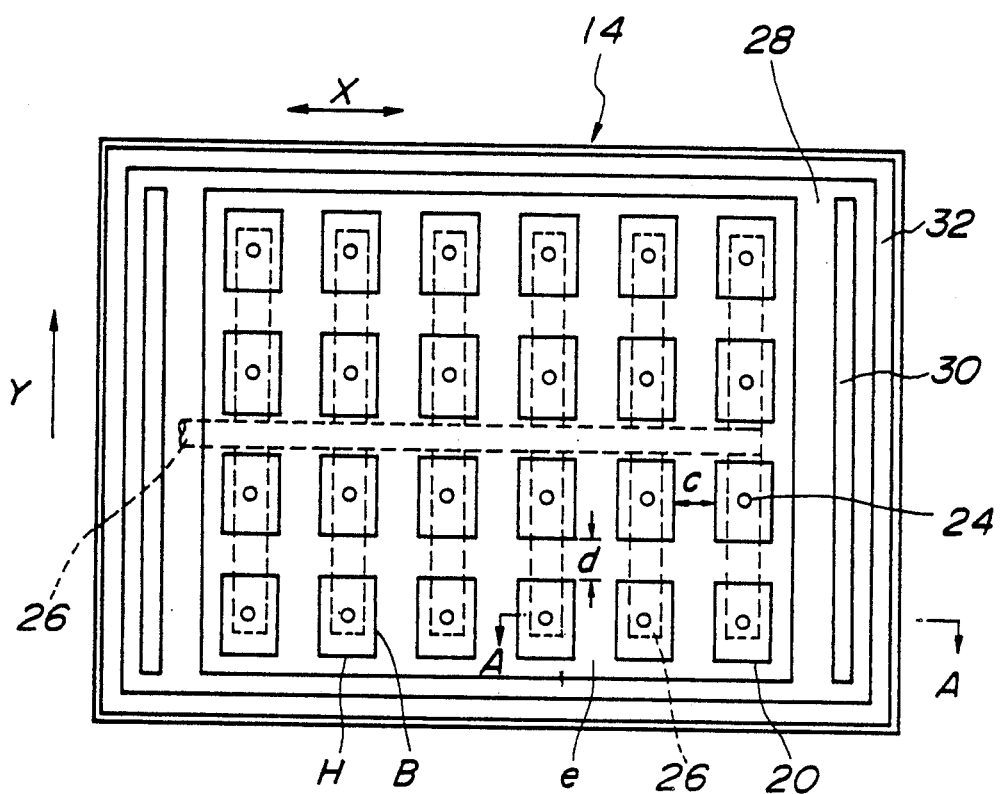
FIG. 2(A) is a plan view showing a major portion of the endless belt type bench testing apparatus according to a first preferred embodiment of the present invention.

Now, an endless belt type bench testing apparatus according to preferred embodiments of the present invention will be described hereinbelow with reference to FIG. 1 to FIG. 9(B).

FIG. 1 shows a general structure of the endless belt type bench testing apparatus, to which all the preferred embodiments of the present invention described hereinafter are applicable. In FIG. 1, the endless belt type bench testing apparatus 2 has a pair of rotary drums 4 and 6 which are rotatable about respective drum shafts 8 and 10. The rotary drums 4 and 6 are arranged in a spaced apart relationship to each other to define a predetermined distance or space therebetween. At least one of the rotary drums 4 and 6 is connected to a load serving as resistance against rotation thereof, and also to a dynamometer for measuring a force or torque exerted on the associated drum through a flexible metallic endless belt 12 which is wrapped or wound over the rotary drums. A supporting base 14 is provided between the pair of the drums 4 and 6 and beneath the belt 12. An upper surface 16 of the supporting base 14 faces the belt with a predetermined small clearance gap therebetween. The supporting base 14 and the associated portion of the endless belt 12 forms a road simulated portion, on which a vehicular tire 18 or tires to be tested are mounted.

A liquid lubricating layer is formed within the clearance gap G for lubricating and supporting the belt 12 with respect to the upper surface 16 of the supporting base 14 for smooth movement of the belt. Though any of appropriate liquid lubricating mediums, such as water, lubricant oil and so forth can be used for forming the liquid lubricating layer, the shown embodiments described later use the water as the lubricating medium. In order to form the lubricating layer within the clearance gap G, a water supply system, though not shown in FIG. 1, is provided in the apparatus. The water supply system generally includes a water supply path defined within the supporting base 14. The water supply path is connected to a water supply source to be supplied with the pressurized water. The water supply path is communicated with a plurality of water discharge ports formed on the upper surface 16 of the supporting base 14 through associated discharge or ejection holes of a small diameter. The water discharge ports open to the clearance gap G defined between the belt 12 and the upper surface 16 of the supporting base 14. Accordingly, the water is supplied from the water supply source into the water discharge ports through the water supply path and the associated discharge holes to form the water layer within the clearance gap G between the belt 12 and the supporting base 14.

FIGS. 2(A),(B) and (C) show a first preferred embodiment of the endless belt type bench testing apparatus according to the present invention. In these figures, like parts or members are denoted by the same reference numerals as in FIG. 1 to avoid a redundant disclosure.

In FIG. 2(A), a plurality of the water discharge ports 20 are formed on the upper surface 16 of the supporting base 14. Each port 20 is of an essentially rectangular configuration in plan view having a longer side B extending in a direction Y perpendicular to a belt running direction denoted by an arrow X and a shorter side H extending in the belt running direction X. The water discharge ports 20 are arranged in longitudinal and lateral alignments in a form of a matrix to define land portions e thereamong. Specifically, the ports 20 are arranged in the direction X with a predetermined interval c and in the direction Y with a predetermined interval d.

Figure 2B:
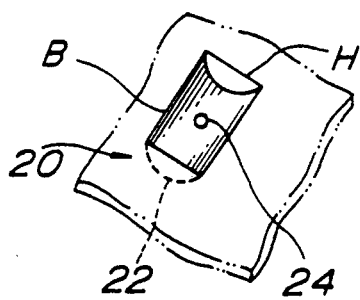
FIG. 2(B) is a perspective view showing a shape of a discharge port illustrated in FIG. 2(A)

As shown in FIGS. 2(B) and (C), each port 20 has an arc-shaped bottom 22 extending in the direction X and the discharge or ejection hole 24 of a small diameter formed substantially at the center of the arc-shaped bottom 22. The discharge holes 24 are communicated with the water supply path 26 which, in turn, is communicated with the water supply source (not shown) to supply the pressurized water into the associated ports 20.

A water collecting groove 28 is formed on the upper surface 16 of the supporting base 14 encircling the water discharge ports 20. Further, a pair of inner and outer felt seals 30 and 32 are provided in the groove 28 for absorbing the water collected in the groove 28. The inner felt seal 30 extends in the direction Y and arranged at a downstream end portion of the upper surface 16 of the supporting base 14, while the outer felt seal 32 is arranged along the circumference of the supporting base upper surface 16. In this embodiment, since the belt 12 is designed to run both in opposite directions denoted by the arrow X, the inner felt seal 30 is arranged at both opposite ends of the supporting base upper surface 16. The groove 28 and the inner and outer seals 30 and 32 work to prevent the water which is discharged from the clearance gap G, from flowing out.

The operation of the first preferred embodiment as described above will be explained hereinbelow.

The highly pressurized water is supplied to the water discharge ports 20 at the time of starting of the belt 12 as well as during the belt running speed being below a predetermined high speed. This highly pressurized water is introduced in the clearance gap G and forms a water layer between the belt and the land portions e so as to smoothly support the belt 12 by the static pressure of the water. When the belt running speed reaches the predetermined high speed where a required stress is generated due to the shearing action of the water, a pressure and an amount of the water supplied into the ports 20 are controlled to be reduced. Since each port 20 has the arc-shaped bottom extending in the belt running direction X, the supplied water is effectively introduced into the clearance gap G between the belt and the land portions e to generate the required dynamic pressure in the form of the water layer for supporting the belt 12.

It is to be appreciated that each water discharge port 20 may have a square shape in plan view having four sides of the same length.

In the first preferred embodiment, since the static pressure and the dynamic pressure are effectively combined to support the belt, the contact between the belt and the supporting base upper surface 16 is prevented even at the time of starting of the belt and before the belt running speed reaches the predetermined high speed. Accordingly, the frictional damages of the belt and the supporting base upper surface is effectively prevented. Further, a measurement error due to a frictional torque loss is also effectively prevented.

Still further, since the water discharge ports 20 are arranged in longitudinal and lateral alignments in the form of the matrix, and since each port 20 is supplied with the pressurized water independently of the others, even when the belt is slanted laterally, the pressure drop due to the leakage of the supplied water is effectively prevented.

Still further, since the belt is supported by the dynamic pressure after the belt running speed reaches the predetermined high speed, a supply amount of the water can be reduced, so that the water supply system including, such as a water tank and a water pump, can be made smaller in size. Further, since an amount of the circulating water can also be reduced, the water temperature control system can also be made smaller in size.

FIG. 3 shows a second preferred embodiment of the endless belt type bench testing apparatus according to the present invention, wherein like parts or members are denoted by the same reference numerals as in FIGS. 2(A), (B) and (C) to avoid a redundant disclosure.

In the second preferred embodiment, the longitudinal interval c between the adjacent ports 20 and a length of the side H of the port 20 have a dimensional relationship of $c \leq H$, and the lateral interval d of the adjacent ports 20 and a length of the side B of the port 20 have a dimensional relationship of $d = B/2$ to $2B/3$. It has been confirmed based on various experiments that, by setting the dimensional relationship to $c \leq H$, the dynamic pressure in the form of the water layer is more effectively generated, while, by setting the dimensional relationship to $d = B/2$ to $2B/3$, the belt is evenly supported by the static pressure since a mutual interference of the static pressure between the adjacent ports 20 is effectively prevented.

The other structures and operations of the second preferred embodiment is the same as those of the first preferred embodiment. It is to be appreciated that each port 20 may have a square shape in plan view having four sides of the same length.

Figure 2C:
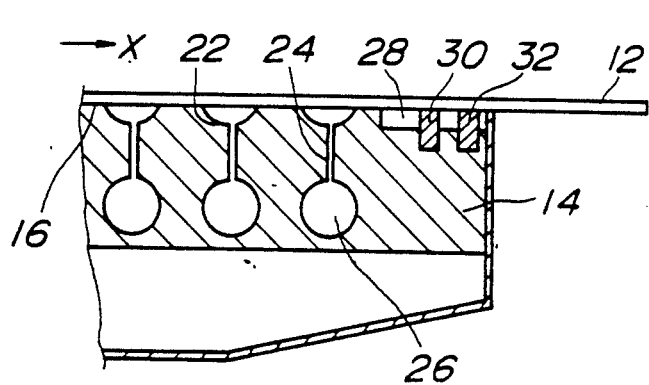
FIG. 2(C) is a sectional view taken along a line A—A in FIG. 2(A)
Figure 4A:
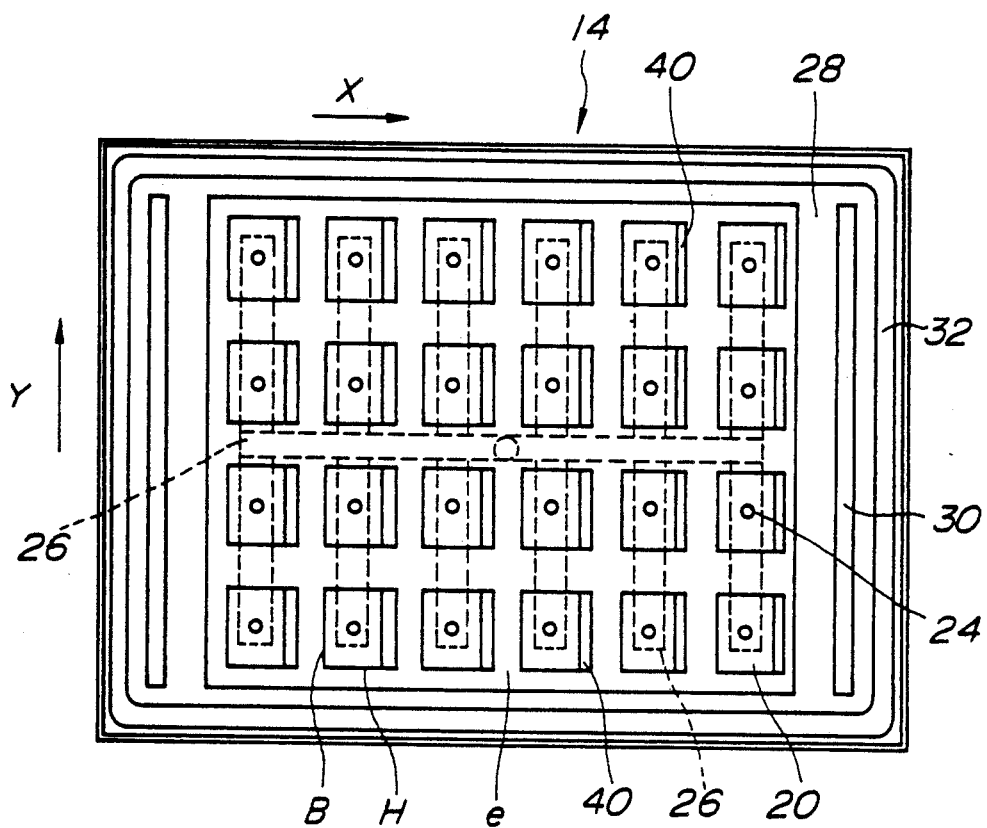
FIG. 4(A) is a plan view showing a major portion of the endless belt type bench testing apparatus according to a third preferred embodiment of the present invention.
Figure 4B:
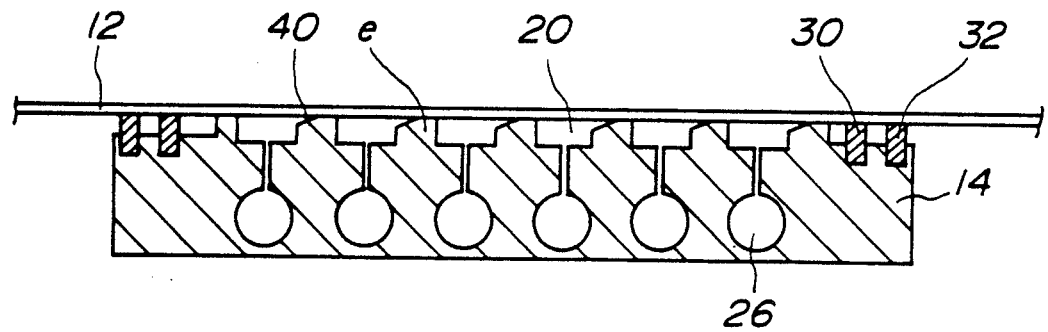
FIG. 4(B) is a sectional view of FIG. 4(A) showing an arrangement of discharge ports each having a slant surface.

FIGS. 4(A) and (B) show a third preferred embodiment of the endless belt type bench testing apparatus according to the present invention, wherein like parts or members are denoted by the same reference numerals as in FIGS. 2 (A), (B) and (C) to avoid a redundant disclosure.

In the third preferred embodiment, each port 20 has an essentially rectangular parallelopiped shape with a slant surface 40 at a downstream side thereof with respect to the belt running direction. The slant surface is formed by cutting-out one of the sides B of the port 20 positioned at the downstream side and is inclined upward along the belt running direction X for allowing the supplied water to be smoothly introduced into the clearance gap G between the belt and the land portions e by the running movement of the belt 12.

It is to be appreciated that if the belt is designed to run both in opposite directions, the slant surface 40 is provided at both opposite sides B of the port 20.

In the third preferred embodiment as shown in FIGS. 4(A) and (B), the dynamic pressure is effectively generated by means of the slant surfaces which allow the water to be smoothly introduced into the clearance gap G between the belt and the land portions e by the running movement of the belt 12.

The other structures and operations of the third preferred embodiment are the same as in the first preferred embodiment. It is to be appreciated that each port 20 may have a square shape in plan view having four sides of the same length.

Figure 5:
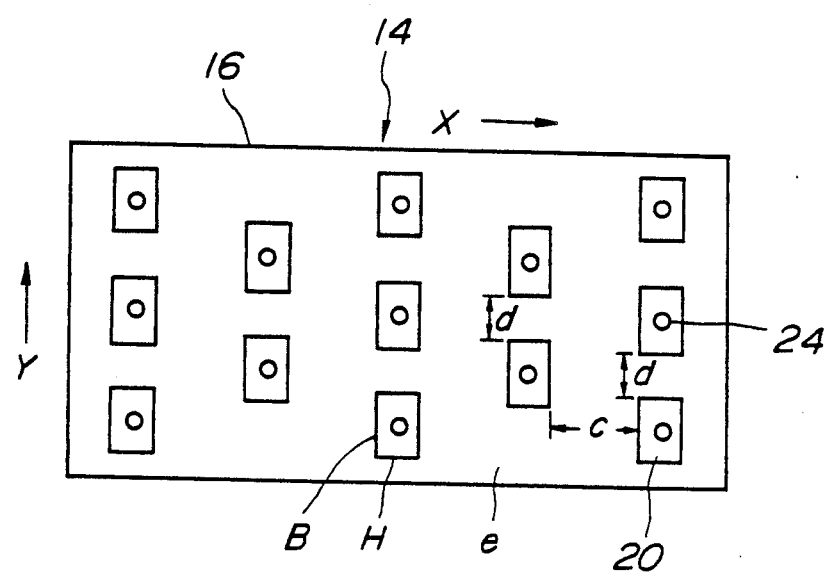
FIG. 5 is a plan view showing a major portion of the endless belt type bench testing apparatus according to a fourth preferred embodiment of the present invention.

FIG. 5 shows a fourth preferred embodiment of the endless belt type bench testing apparatus according to the present invention, wherein like parts or members are denoted by the same reference numerals as in FIGS. 2(A), (B) and (C) to avoid a redundant disclosure.

In the fourth preferred embodiment, a plurality of the ports 20 are arranged with the predetermined interval d in the direction Y perpendicular to the belt running direction X, which forms one transverse or lateral unit. A plurality of the transverse units are arranged with the predetermined interval c along the belt running direction X such that positions of the ports 20 forming the one transverse unit are shifted alternately along the belt running direction, so that when viewing along the belt running direction, there exists at least one port 20 over a width of the supporting base upper surface 16 except for at extream lateral ends of the supporting base upper surface 16.

By arranging the ports 20 as noted above, the dynamic pressure is more evenly generated across the land portions e.

It is to be appreciated that each port 20 may have either the arc-shaped bottom or a planar bottom, in view of the extream feature of the fourth preferred embodiment residing in the particular arrangement of the ports 20.

The other structures and operations of the fourth preferred embodiment are the same as those of the first preferred embodiment. It is also to be appreciated that each port 20 may have a square shape in plan view having four sides of the same length.

Figure 6A:
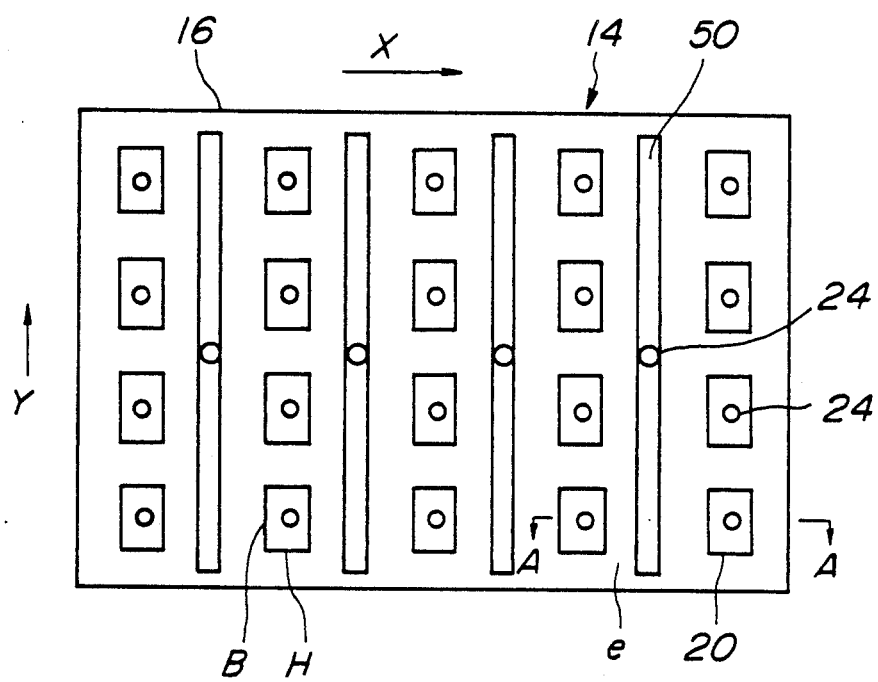
FIG. 6(A) is a plan view showing a major portion of the endless belt type bench testing apparatus according to a fifth preferred embodiment of the present invention.

FIGS. 6(A) and (B) show a fifth preferred embodiment of the endless belt type bench testing apparatus according to the present invention, wherein like parts or members are denoted by the same reference numerals as in FIGS. 2(A), (B) and (C) to avoid a redundant disclosure.

In the fifth preferred embodiment, a plurality of the ports 20 are arranged with a predetermined interval in the direction Y perpendicular to the belt running direction, which forms one transverse or lateral unit. A plurality of the transverse units are arranged with a predetermined interval in the belt running direction X. In addition to the ports 20, a plurality of elongate water discharge ports 50 are formed on the supporting base upper surface 16. The elongate ports 50 are arranged in the belt running direction X and each extend in the direction Y essentially over the width of the supporting base upper surface 16. Each elongate port 50 has the discharge or ejection hole 24 substantially at the center of a V-shaped bottom, which, in turn, is communicated with the water supply path 26, so that the pressurized water is introduced into the elongate ports 50 as into the ports 20.

The transverse units and the elongate ports 50 are arranged alternately with a predetermined interval along the belt running direction X so as to ensure an evenly distributed dynamic pressure across the land portions e.

Figure 6B:
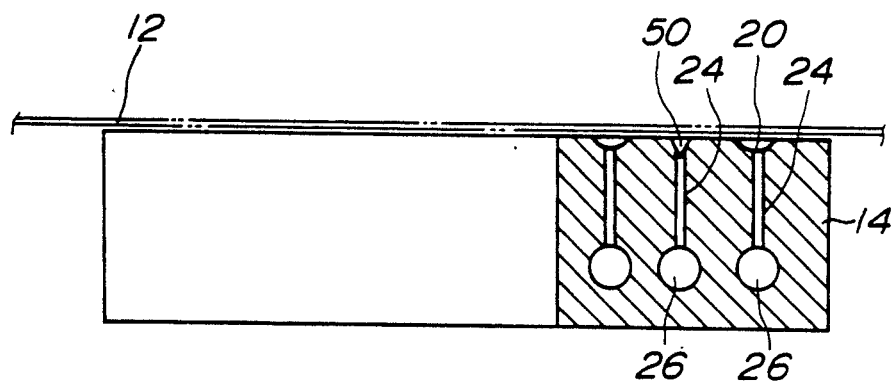
FIG. 6(B) is a sectional view taken along a line A—A in FIG. 6(A)

It is to be appreciated that each port 20 may have either the arc-shaped bottom as shown in FIG. 6(B) or a bottom of the other shapes and that each elongate port 50 may have either the V-shaped bottom as shown in FIG. 6(B) or a bottom of other shapes, in view of the extream feature of the fifth preferred embodiment residing in the particular arrangement of the ports 20 and the elongate ports 50. It is also to be appreciated that the port 20 may have a square shape in plan view having four sides of the same length.

The other structures and operations of the fifth preferred embodiment are the same as those of the first preferred embodiment.

Figure 7:
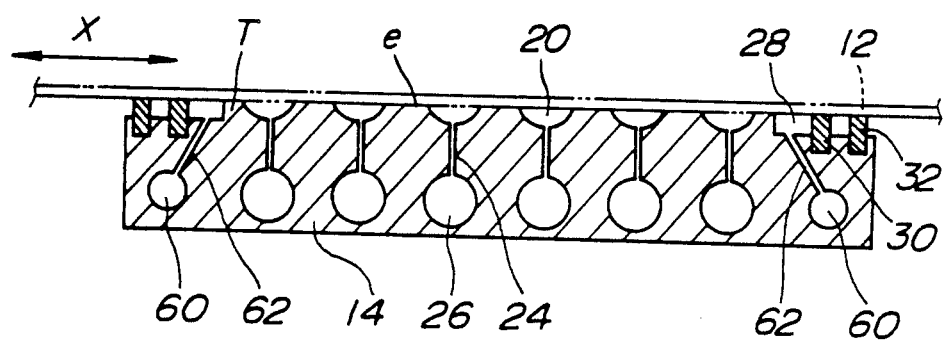
FIG. 7 is a sectional view showing a major portion of the endless belt type bench testing apparatus according to a sixth preferred embodiment of the present invention.

FIG. 7 shows a sixth preferred embodiment of the endless belt type bench testing apparatus according to the present invention, wherein like parts or members are denoted by the same reference numerals as in FIGS. 2(A), (B) and (C) to avoid a redundant disclosure.

In the sixth preferred embodiment, an auxiliary water supply path 60 and auxiliary discharge or ejection means 62 are formed in the supporting base 14 at an upstream end thereof. Specifically, the auxiliary discharge means 62 is either in the form of an elongate groove extending in a direction perpendicular to the belt running direction X essentially over the width of the supporting base 14 and communicating the water collecting groove 28 with the auxiliary water supply path 60, or in the form of a plurality of holes arranged with a predetermined interval in the direction perpendicular to the belt running direction X and each extending between the water collecting groove 28 and the auxiliary water supply path 60. The elongate groove or hole 62 is inclined upward along the belt running direction X to eject the pressurized water into the water collecting groove 28 toward a land portion T which is not defined by the adjacent ports 20, i.e. which has no port 20 at its upstream side. Accordingly, a required dynamic pressure is also generated between the belt 12 and the land portion T for supporting the belt at this portion, so that the frictional damages of the belt and the land portion T as well as the frictional torque loss are effectively prevented. Relatively high pressure water in comparison with the water supplied into the ports 20 is supplied to the auxiliary elongate groove or holes 62 through the auxiliary water supply path 60 for ensuring the reliable supporting of the belt at the land portion T.

It is to be appreciated that if the belt 12 is designed to run both in opposite directions X, the auxiliary water supply path 60 and the auxiliary discharge or ejection means 62 are provided at both opposite longitudinal ends of the supporting base 14.

The other structures and operations are the same as those of the first preferred embodiment.

It is also to be appreciated that the port 20 may be in the form of an elongate port extending in the direction perpendicular to the belt running direction essentially over the width of the supporting base 14 and that the port 20 may have either the arc-shaped bottom as shown in FIG. 7 or a bottom of other shapes, in view of the extream feature of the sixth embodiment residing in the particular arrangement of the auxiliary water supply system.

Figure 8A:
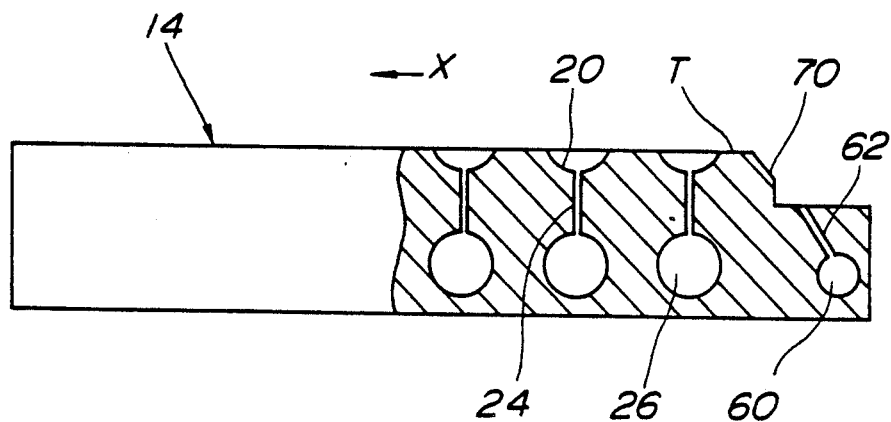
FIG. 8(A) is a sectional view showing a major portion of the endless belt type bench testing apparatus according to a seventh preferred embodiment of the present invention.

FIG. 8(A) shows a seventh preferred embodiment of the endless belt type bench testing apparatus according to the present invention, wherein like parts or members are denoted by the same reference numerals as in FIG. 7 to avoid a redundant disclosure.

The seventh preferred embodiment is a modification of the sixth embodiment shown in FIG. 7. In the seventh preferred embodiment, a slant surface 70 is formed at an upstream end of the land portion T. The slant surface 70 is inclined upward along the belt running direction X for smoothly guiding the water ejected toward the slant surface 70 through the auxiliary water supply path 60 and the auxiliary discharge or ejection means 62, into between the belt 12 and the land portions T so as to effectively generate the required dynamic pressure in the form of the water layer therebetween.

In case the port 20 is an elongate port extending in a direction perpendicular to the belt running direction X, the slant surface may have a lateral length which is substantially the same as that of the elongate port 20 or longer. On the other hand, the discharge or ejection means 62 may be either in the form of the elongate groove having a lateral length which is substantially the same as that of the slant surface 70, or in the form of a plurality of nozzle holes arranged laterally with a predetermined interval. Further, in case the ports 20 are arranged as in the first embodiment, the slant surface 70 may be devided into a plurality of slant surfaces which are separately arranged laterally to provide a longitudinal alignment with the corresponding ports 20. In this case, the auxiliary discharge holes 62 are arranged in a manner to effectively supply the water to the corresponding slant surfaces.

It is to be appreciated that if the belt 12 is designed to run both in opposite directions X, the slant surface 70 is provided at both longitudinal opposite ends of the supporting base 14.

The other structures and operations of the seventh embodiment are the same as those of the sixth embodiment.

Figure 8B:
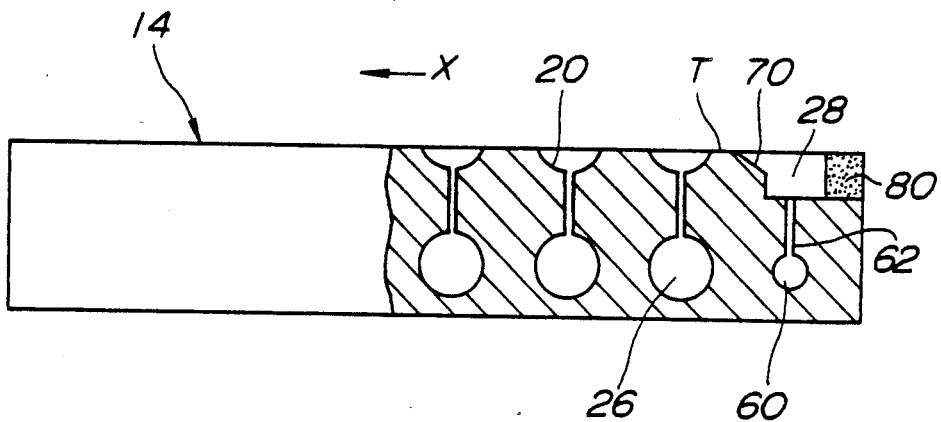
FIG. 8(B) is a sectional view showing a major portion of the endless belt type bench testing apparatus according to an eighth preferred embodiment of the present invention.

FIG. 8(B) shows an eighth preferred embodiment of the endless belt type bench testing apparatus according to the present invention, wherein like parts or members are denoted by the same reference numerals as in FIG. 8(A) to avoid a redundant disclosure.

The eighth preferred embodiment is a modification of the seventh preferred embodiment. In the eighth embodiment, dam means 80 made of porous material, such as felt, is provided in the water collecting groove 28 in addition to the inner and outer felt seals 30 and 32, or in place of the inner felt seal 30 for temporarily storing the water supplied through the auxiliary water supply system. The temporarily stored water is introduced into between the belt and the land portion T through the slant surface 70 by the running movement of the belt so as to generate the dynamic pressure in the form of the water layer between the belt and the land portion T. Accordingly, as opposed to the seventh embodiment, since it is not necessary for the auxiliary discharge groove or holes 62 to eject the water directly to the slant surface 70, the auxiliary discharge groove or holes 62 is designed to extend vertically toward the water collecting groove 28. Further, the porous dam means 80 works to lubricate the running belt with the water absorbed therein so as to provide a smooth contact therebetween.

The other structures and operations of the eighth embodiment are the same as those of the seventh embodiment.

Figure 9A:
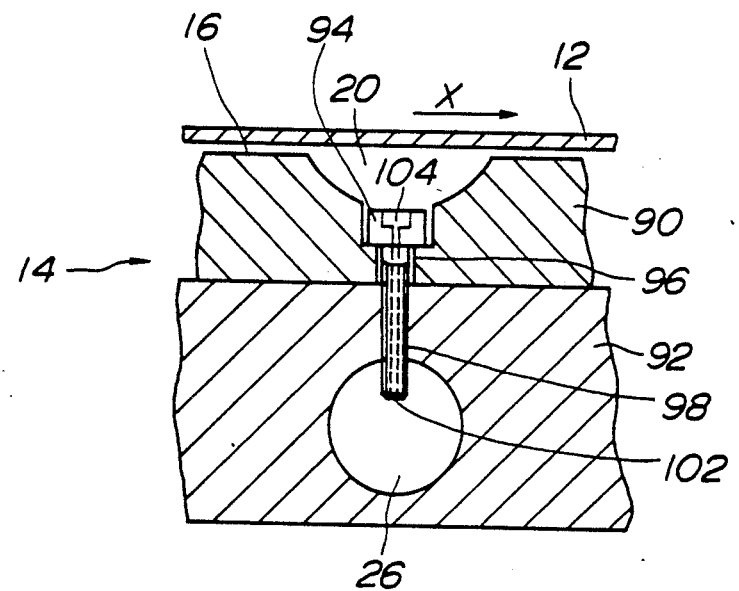
FIG. 9(A) is a sectional view showing a major portion of the endless belt type bench testing apparatus according to a ninth preferred embodiment of the present invention.

FIGS. 9(A) and (B) show a ninth preferred embodiment of the endless belt type bench testing apparatus according to the present invention, wherein like parts or members are denoted by the same reference numerals as in FIGS. 2(A), (B) and (C) to avoid a redundant disclosure.

In the ninth preferred embodiment, the supporting base 14 includes a first section 90 and a second section 92. The first section 90 is disposed facing the belt 12 with the predetermined clearance gap G therebetween and is made of material, such as Teflon, to provide a smooth contact therebetween so as to prevent the frictional damages of the belt 12 as well as the frictional torque loss when the belt contacts the upper surface of the first section 90 due to insufficient pressure of the water layer generated therebetween. The second section 92 is made of any desired material as long as it works effectively as a supporting base for the bench testing appparatus. The first and second sections 90 and 92 are firmly fixed by means of a plurality of bolts 94. Each bolt 94 is inserted into a stepped mounting hole 96 which extends vertically through the first section 90 from the bottom of the water discharge port 20, and is further screwed into a threaded hole 98 which is formed in the second section 92 and opens to the water supply path 26. The stepped mounting hole 96 has a smaller diameter section and a larger diameter section which opens to the water discharge port 20 and receives a head of the bolt 94. The bolt head sits on the step of the stepped mounting hole 96 to urge the first section 90 toward the second section 92 so as to firmly fix the first and second sections 90 nd 92.

Figure 9B:
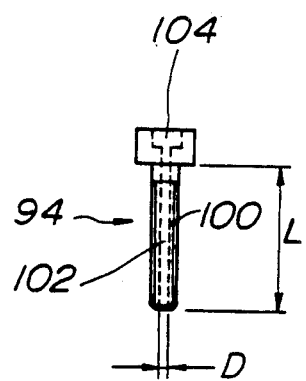
FIG. 9(B) is a front view showing a mounting bolt to be used in the ninth preferred embodiment of FIG. 9(A).

As shown in FIG. 9(B), each bolt 94 is formed with a stepped through hole 100 having a smaller diameter section 102 and a larger diameter section 104. Accordingly, each water discharge port 20 is communicated with the water supply path 26 through the stepped through hole 100 formed through the bolt 94.

In the ninth preferred embodiment, since there are no additional mounting holes required for receiving the bolts as mentioned in the background art, the dynamic pressure in the form of the water layer is effectively generated between the belt 12 and the upper surface 16 of the first section 90 of the supporting base 14.

Further, by selecting a length L and a diameter D of the bolt 94, a required hydraulic pressure level between the belt 12 and the supporting base 14 is easily provided using the same first and second sections 90 and 92.

The other structures and operations of the ninth preferred embodiment is the same as those of the first preferred embodiment.

It is to be appreciated that the bolt 94 is not necessarily provided for each port 20 as long as it is sufficient for firmly fixing the first and second sections 90 and 92. Further, it is also to be appreciated that the port 20 may be arranged in the form of the matrix as in the first preferred embodiment, or may be in the form of the laterally elongate port, or may also have any configuration other than that shown in Fog. 9(A), in view of the extream feature of the ninth preferred embodiment residing in the particular mounting structure of the first and second sections 90 and 92.

It is to be understood that the invention is not to be limited to the embodiments described above, and that various changes and modifications may be made without departing from the spirit and scope of the invention as defined in the appended claims.

What is claimed is:

1. An endless belt type bench testing apparatus, comprising:
   a pair of rotary drums arranged with a predetermined distance therebetween;
   a flexible endless belt wound over said rotary drums and extending therebetween, said belt adapted to move in a first direction;
   a supporting base disposed between said rotary drums and having an operating surface which faces a portion of said belt with a predetermined clearance gap therebetween;
   said operating surface formed with a plurality of first discharge ports which communicate with a liquid medium supply source through first means formed in said supporting base for establishing a hydraulic pressure in a form of a liquid medium layer at said clearance gap;
   second means, associated with said liquid medium, for ensuring effective generation of a dynamic pressure in a form of said liquid medium layer at said clearance gap.

2. An endless belt type bench testing apparatus as set forth in claim 1, wherein said second means is an arc-shaped bottom of each of said discharge ports, said bottom extending in an arc in said first direction.

3. An endless belt type bench testing apparatus as set forth in claim 2, wherein said discharge ports are arranged in an alignment in said first direction and in an alignment in a second direction perpendicular to said first direction to form a matrix of said discharge ports on said operating surface.

4. An endless belt type bench testing apparatus as set forth in claim 1, wherein said second means is a slant surface of each of said discharge ports, said slant surface being formed at a downstream side of each discharge port with respect to said first direction and being inclined upward along said first direction for smoothly guiding said liquid medium into said clearance gap.

5. An endless belt type bench testing apparatus as set forth in claim 4, wherein said discharge ports are arranged in an alignment in said first direction and in an alignment in a second direction perpendicular to said first direction to form a matrix of said discharge ports on said operating surface.

6. An endless belt type bench testing apparatus as set forth in claim 1, wherein said second means is an arrangement of said discharge ports on said operating surface such that said discharge ports are arranged in an alignment in a second direction perpendicular to said first direction, while said discharge ports are shifted in position alternately in said first direction in a manner that when viewing along said first direction, at least one of said discharge ports is provided on said operating surface except for at opposite ends of said operating surface in said second direction.

7. An endless belt type bench testing apparatus as set forth in claim 1, wherein each discharge port has a rectangular or square shape in plan view having a first side extending along said first direction and a second side extending along a second direction perpendicular to said first direction, said discharge ports being arranged in an alignment in said first direction and in an alignment in said second direction to form a matrix of said discharge ports on said operating surface, and said second means is an arrangement of said discharge ports on said operating surface such that a length of said first side is no less than a distance in said first direction between the adjacent discharge ports and a distance in said second direction between the adjacent discharge ports is one-half to two-thirds of a length of said second side.

8. An endless belt type bench testing apparatus as set forth in claim 1, wherein said first discharge ports are arranged in an alignment in said first direction and in an alignment in a second direction perpendicular to said first direction to form a matrix of said first discharge ports on said operating surface, and said second means is a plurality of second discharge ports each extending in said second direction essentially across said operating surface except for at opposite ends of said operating surface in said second direction, said first and second discharge ports arranged alternately in said first direction.

9. An endless belt type bench testing apparatus as set forth in claim 1, wherein said second means is an additional liquid medium supply system which supplies liquid medium at an upstream end of said operating surface with respect to said first direction to generate the dynamic pressure between said belt and said upstream end of said operating surface.

10. An endless belt type bench testing apparatus as set forth in claim 9, wherein said second means includes a slant surface formed at said upstream end of the operating surface, said slant surface being inclined upward along said first direction.

11. An endless belt type bench testing apparatus as set forth in claim 10, wherein said second means includes dam means made of porous material, said dam means arranged upstream of said upstream end of the operating surface for temporarily storing the liquid medium to be introduced into between the belt and said upstream end of the operating surface.

12. An endless belt type bench testing apparatus as set forth in claim 1, wherein said supporting base includes first and second sections, said first section having said operating surface and said second section being arranged under said first section, and said first means includes a liquid medium supply path formed in said second section and communicating with said liquid medium supply source, said first means further including a first hole formed in said first section and extending from a bottom of each discharge port and a corresponding second hole formed in said second section and extending from said liquid medium supply path, said first and second holes being aligned with each other and cooperatively communicating said discharge port with said liquid medium supply path, and said second means is a plurality of mounting bolts each inserted into said first and second holes in a manner to firmly fix said first and second sections, each bolt having a third hole formed therethrough for allowing the liquid medium from said liquid medium supply path to pass through said third hole into said discharge port.

* * * * *